United States Patent
Behrens et al.

(10) Patent No.: US 11,535,699 B2
(45) Date of Patent: Dec. 27, 2022

(54) CURING COMPOSITION FOR AN EPOXY RESIN COMPOUND, EPOXY RESIN COMPOUND AND MULTI-COMPONENT EPOXY RESIN SYSTEM

(71) Applicant: Hilti Aktiengesellschaft, Schaan (LI)

(72) Inventors: Nicole Behrens, Munich (DE); Alexander Bornschlegl, Munich (DE)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 17/276,914

(22) PCT Filed: Sep. 9, 2019

(86) PCT No.: PCT/EP2019/073937
§ 371 (c)(1),
(2) Date: Mar. 17, 2021

(87) PCT Pub. No.: WO2020/058015
PCT Pub. Date: Mar. 26, 2020

(65) Prior Publication Data
US 2021/0324134 A1    Oct. 21, 2021

(30) Foreign Application Priority Data
Sep. 19, 2018   (EP) .................................... 18195422

(51) Int. Cl.
| C08G 59/56 | (2006.01) |
| C04B 26/14 | (2006.01) |
| C08G 59/24 | (2006.01) |
| C08G 59/32 | (2006.01) |
| C08G 59/62 | (2006.01) |
| C08K 3/16 | (2006.01) |
| C08K 3/28 | (2006.01) |
| C08K 5/5435 | (2006.01) |
| C08L 63/00 | (2006.01) |
| C04B 111/00 | (2006.01) |

(52) U.S. Cl.
CPC ............. *C08G 59/56* (2013.01); *C04B 26/14* (2013.01); *C08G 59/245* (2013.01); *C08G 59/32* (2013.01); *C08G 59/623* (2013.01); *C08K 3/16* (2013.01); *C08K 3/28* (2013.01); *C08K 5/5435* (2013.01); *C08L 63/00* (2013.01); *C04B 2111/00715* (2013.01); *C08K 2003/162* (2013.01); *C08K 2003/287* (2013.01)

(58) Field of Classification Search
CPC ...... C08G 59/56; C08G 59/245; C08G 59/32; C08G 59/623; C04B 26/14; C04B 2111/00715; C08K 3/16; C08K 3/28; C08K 5/5435; C08K 2003/162; C08K 2003/287; C08L 63/00

USPC .......................................................... 523/400
See application file for complete search history.

(56) References Cited

U.S. PATENT DOCUMENTS

| 5,629,380 | A | 5/1997 | Baldwin et al. |
| 7,498,389 | B2 | 3/2009 | Vogel et al. |
| 10,941,242 | B2 | 3/2021 | Sato et al. |
| 2007/0119745 | A1 | 5/2007 | Vogel et al. |
| 2015/0159040 | A1* | 6/2015 | Boelter .................. C01B 32/05 523/400 |
| 2017/0166687 | A1* | 6/2017 | Ortelt ..................... C08G 59/50 |
| 2017/0292050 | A1* | 10/2017 | Burckhardt .......... C08G 18/718 |
| 2019/0112416 | A1 | 4/2019 | Sato et al. |

FOREIGN PATENT DOCUMENTS

| EP | 3275915 A1 * | 1/2018 | ............. C08G 59/50 |
| WO | 2005/090433 | 9/2005 | |
| WO | 2017/175740 | 10/2017 | |

OTHER PUBLICATIONS

U.S. Appl. No. 17/276,852, filed Mar. 17, 2021, Behrens et al.
U.S. Appl. No. 17/276,939, filed Mar. 17, 2021, Nicole Behrens.
U.S. Appl. No. 17/276,968, filed Mar. 17, 2021, Behrens et al.
International Search Report dated Oct. 24, 2019 in PCT/EP2019/073937, with English translation, 5 pages.
Written Opinion dated Oct. 24, 2019 in PCT/EP2019/073937, with English translation, 8 pages.
U.S. Office Action dated Mar. 29, 2022 in U.S. Appl. No. 17/276,968, 14 pages.
U.S. Office Action dated Oct. 24, 2022, in U.S. Appl. No. 17/276,968, 13 pages.

* cited by examiner

*Primary Examiner* — David T Karst
(74) *Attorney, Agent, or Firm* — Grüneberg and Myers, PLLC

(57) ABSTRACT

A curing composition for an epoxy resin compound useful for the chemical fastening of construction elements, an epoxy resin compound, and a multi-component epoxy resin system are provided. A method for the chemical fastening of construction elements in boreholes and a method of using a salt (S) as an accelerator in an epoxy resin compound for chemical fastening, the epoxy resin compound including a Mannich base and an amine which is reactive to epoxy groups.

12 Claims, No Drawings

CURING COMPOSITION FOR AN EPOXY RESIN COMPOUND, EPOXY RESIN COMPOUND AND MULTI-COMPONENT EPOXY RESIN SYSTEM

CROSS-REFERENCE TO RELATED APPLICATIONS

This application is a National Stage entry under § 371 of International Application No. PCT/EP2019/073937, filed on Sep. 9, 2019, and which claims the benefit of European Application No. 18195422.3, filed on Sep. 19, 2018. The content of each of these applications is hereby incorporated by reference in its entirety.

BACKGROUND OF THE INVENTION

Field of the Invention

The invention relates to a curing composition for an epoxy resin compound for the chemical fastening of construction elements, to an epoxy resin compound, and to a multi-component epoxy resin system. The invention further relates to a method for the chemical fastening of construction elements in boreholes. The invention also relates to the use of a salt (S) as an accelerator in an epoxy resin compound for chemical fastening, the epoxy resin compound comprising a Mannich base and an amine which is reactive to epoxy groups.

Multi-component mortar compounds based on curable epoxy resins and amine curing agents have been known for some time and are used as adhesives, spackling pastes for repairing cracks and chemical anchors for fastening construction elements such as anchor rods, reinforcing bars, and screws in boreholes of various substrates. Known mortar compounds are, however, highly limited in their use in countries of high temperatures, such as the United Arab Emirates, because the load capacity (failure loads) of the mortar compounds starts to decrease from a temperature of 35° C. Furthermore, high temperatures have a negative impact on the handling behavior and processing time of the mortar compounds on construction sites.

With conventional mortar compounds, a high proportion of low-viscosity constituents, a low filler proportion and coarse fillers should be provided in order to achieve good handling behavior, although this is disadvantageous in terms of low creep behavior under a load at elevated temperatures. Conversely, a long processing time is achieved as a result of a high proportion of non-reactive or non-crosslinking diluents and less reactive components, and this prevents a short curing time.

Description of Related Art

The use of Mannich bases as a constituent of curing compositions for epoxy resins is known and described, inter alia, in DE 10 2013 113465 A and WO 2005/090433.

Mannich bases are generally used in combination with polyamines and optionally further constituents as curing compositions of multi-component epoxy resin compounds for fastening purposes.

WO 2014/067095 A describes a curing composition for epoxides which contains a combination of phenalkamine and styrenated phenol or styrenated phenol novolac. Phenalkamine is a particular, highly hydrophobic Mannich base which is obtained by reacting cashew nut shell liquid (CNSL), formaldehyde and polyamines such as diethylenediamine.

Mortar compounds which are based on epoxy amine and comprise Mannich bases generally have slow curing kinetics, which can be controlled to a certain extent by the phenol content of the Mannich base. Otherwise, the curing speed depends on the amine present in the mixture. Conventional epoxy resin compounds which are available on the market and comprise curing agents based on Mannich bases, such as RE 100 (Hilti, Schaan, Liechtenstein) or FIS EM 390 S (Fischer, Waldachtal, Del.) have a curing time in use of at least 12 hours at 20° C., the curing time referring to the time after which the fastening can be subjected to 90% of the reference load. It is expedient to accelerate the curing time in order to reduce the waiting times before the next work step.

The as yet unpublished European patent application having application number 17200077.0 describes mortar compounds which are based on epoxy resins and Mannich bases and in which a polyphenol from the group of novolac resins is used as an accelerator. Novolac resins are usually present as solids that have to be dissolved in the curing composition. Furthermore, the novolac resins have to be used in large amounts in order to achieve sufficient acceleration. This means that the corresponding mortar compounds have high viscosities, and this leads to high press-out forces during application.

SUMMARY OF THE INVENTION

The object of the invention is therefore to provide an epoxy resin compound which contains at least one Mannich base and is suitable for fastening purposes, it being intended for the epoxy resin compound to have a shorter curing time than conventional mortar compounds, but with a comparatively high pull-out strength. In particular, the object of the present invention is to provide an epoxy resin compound which, by comparison with conventional mortar compounds, has a shorter curing time and improved pull-out strength at elevated temperatures, for example in a temperature range of from 35° C. to 50° C. Furthermore, it is desirable for the epoxy resin compound to exhibit improved pull-out strength in water-filled boreholes by comparison with conventional mortar compounds based on epoxy amine.

The object of the invention is achieved by providing a curing composition according to the embodiments below. Preferred embodiments of the curing composition according to the invention are provided in below embodiments, which may optionally be combined with one another.

The invention further relates to an epoxy resin compound and to a multi-component epoxy resin system as described below. Preferred embodiments of the epoxy resin compound according to the invention and of the multi-component epoxy resin system are provided in the below description, which may optionally be combined with one another.

The invention further relates to a method for the chemical fastening of construction elements in boreholes according to embodiments described below.

The invention also covers the use of at least one salt (S) as an accelerator in an epoxy resin compound according to embodiments described below.

DETAILED DESCRIPTION OF THE INVENTION

According to the invention, a curing composition for an epoxy resin compound is provided, which composition comprises, as a curing agent, at least one Mannich base and an amine which is reactive to epoxy groups, and at least one salt (S) as an accelerator. According to the invention, the Mannich base can be obtained by reacting a phenolic compound selected from the group consisting of phenol, styrenated phenol, pyrocatechol, resorcinol, hydroquinone, hydroxyhydroquinone, phloroglucinol, pyrogallol, o-cresol, m-cresol, p-cresol and bisphenols with an aldehyde or an aldehyde precursor and an amine having at least two active hydrogen atoms in the molecule which are bonded to a nitrogen atom. According to the invention, the salt (S) used as the accelerator is selected from the group consisting of salts of nitric acid, salts of nitrous acid, salts of halogens, salts of trifluoromethanesulfonic acid and combinations thereof.

The use of the curing composition according to the invention in an epoxy resin compound for fastening purposes leads to a considerable acceleration of the curing reaction. The cured compounds exhibit outstanding pull-out strength at elevated temperatures and can therefore be subjected to loading after only a short period of time, within approximately 4 to 6 hours. The curing composition according to the invention and the epoxy resin compounds prepared therefrom are therefore particularly suitable for use in countries of high temperatures. Furthermore, the cured compounds exhibit excellent pull-out strength in the water-filled borehole.

According to a preferred embodiment of the curing composition according to the invention, the amine which is reactive to epoxy resins is selected from the group consisting of aliphatic, alicyclic, araliphatic and aromatic amines. The amine preferably has on average at least two reactive hydrogen atoms per molecule which are bonded to a nitrogen atom.

Amines which are reactive to epoxy groups are fundamentally known to a person skilled in the art. The amine is preferably a polyamine having at least two amino groups in the molecule. Particularly stable networking can be achieved when using polyamines in the curing composition.

Within the context of the invention, the terms used above and in the following description have the following meanings:

"Aliphatic compounds" are acyclic or cyclic, saturated or unsaturated carbon compounds, excluding aromatic compounds;

"Alicyclic compounds" are compounds having a carbocyclic ring structure, excluding benzene derivatives or other aromatic systems;

"Araliphatic compounds" are aliphatic compounds having an aromatic backbone such that, in the case of a functionalized araliphatic compound, a functional group that is present is bonded to the aliphatic rather than the aromatic part of the compound;

"Aromatic compounds" are compounds which follow Hückel's (4n+2) rule;

"Amines" are compounds which are derived from ammonia by replacing one, two or three hydrogen atoms with hydrocarbon groups, and have the general structures $RNH_2$ (primary amines), $R_2NH$ (secondary amines) and $R_3N$ (tertiary amines) (see: IUPAC Compendium of Chemical Terminology, 2nd ed. (the "Gold Book"), compiled by A. D. McNaught and A. Wilkinson, Blackwell Scientific Publications, Oxford (1997)); and "Salts" are compounds that are made up of positively charged ions (cations) and negatively charged ions (anions). There are ionic bonds between these ions. The expression "salts of nitric acid" describes compounds which are derived from nitric acid ($HNO_3$) and which comprise, as an anion, a nitrate ($NO_3^-$). The expression "salts of nitrous acid" describes compounds which are derived from nitrous acid ($HNO_2$) and which comprise, as an anion, a nitrite ($NO_2^-$). The expression "salts of halogens" describes compounds which comprise, as an anion, an element from group 7 of the periodic table. In particular, the expression "salts of halogens" should be understood to mean compounds which comprise, as an anion, a fluoride ($F^-$), chloride ($Cl^-$), bromide ($Br^-$) or iodide ($I^-$). The expression "salts of trifluoromethanesulfonic acid" describes compounds which are derived from trifluoromethanesulfonic acid ($CF_3SO_3H$) and which comprise, as an anion, a triflate ($CF_3SO_3^-$). In the context of the present invention, the term "salt" also covers the corresponding hydrates of the salts. The salts (S) used as accelerators are also referred to as "salts" in the context of the present invention.

Examples of suitable amines which are reactive to epoxy groups are given below, but without restricting the scope of the invention: 1,2-diaminoethane(ethylenediamine), 1,2-propanediamine, 1,3-propanediamine, 1,4-diaminobutane, 2,2-dimethyl-1,3-propanediamine (neopentanediamine), diethylaminopropylamine (DEAPA), 2-methyl-1,5-diaminopentane, 1,3-diaminopentane, 1,3-diaminopentane, 2,2,4- or 2,4,4-trimethyl-1,6-diaminohexane and mixtures thereof (TMD). 1,3-bis(aminomethyl)-cyclohexane, 1,2-bis(aminomethyl)cyclohexane, hexamethylenediamine (HMD), 1,2- and 1,4-diaminocyclohexane (1,2-DACH and 1,4-DACH), bis(4-amino-3-methylcyclohexyl)methane, diethylenetriamine (DETA), 4-azaheptane-1,7-diamine, 1,11-diamino-3,6,9-trioxundecane, 1,8-diamino-3,6-dioxaoctane, 1,5-diamino-methyl-3-azapentane, 1,10-diamino-4,7-dioxadecane, bis(3-aminopropyl)amine, 1,13-diamino-4,7,10-trioxatridecane, 4-aminomethyl-1,8-diaminooctane, 2-butyl-2-ethyl-1,5-diaminopentane, N,N-bis(3-aminopropyl)methylamine, triethylenetetramine (TETA), tetraethylenepentamine (TEPA), pentaethylenehexamine (PEHA), 1,3-benzenedimethanamine (m-xylylenediamine, mXDA), 1,4-benzenedimethanamine (p-xylylenediamine, pXDA), 5-(aminomethyl)bicyclo[[2.2.1]hept-2-yl] methylamine (NBDA, norbornane diamine), dimethyldipropylenetriamine, dimethylaminopropylaminopropylamine (DMAPAPA), 3-aminomethyl-3,5,5-trimethylcyclohexyl amine (isophorone diamine (IPDA)), diaminodicyclohexyl methane (PACM), diethylmethylbenzenediamine (DETDA). 4,4'-diaminodiphenylsulfone (dapsone), mixed polycyclic amines (MPCA) (e.g. Ancamine 2168), dimethyldiaminodicyclohexylmethane (Laromin C260), 2,2-bis(4-aminocyclohexyl)propane, (3(4),8(9)bis(aminomethyldicyclo[5.2.1.0$^{2,6}$]decane (mixture of isomers, tricyclic primary amines; TCD-diamine), methylcyclohexyl diamine (MCDA), N,N'-diaminopropyl-2-methylcyclohexane-1,3-diamine, N,N'-diaminopropyl-4-methylcyclohexane-1,3-diamine, N-(3-aminopropyl)cyclohexylamine, and 2-(2,2,6,6-tetramethylpiperidin-4-yl) propane-1,3-diamine.

Preferred suitable amines which are reactive to epoxy groups in the curing composition according to the invention are polyamines, such as 2-methylpentanediamine (DYTEK A), 3-aminomethyl-3,5,5-trimethylcyclohexane (IPDA), 1,3-benzenedimethanamine (m-xylylenediamine, mXDA), 1,4-benzenedimethanamine (p-xylylenediamine, PXDA), 1,6-diamino-2,2,4-trimethylhexane (TMD), diethylenetriamine (DETA), triethylenetetramine (TETA), tetraethylenepentamine (TEPA), pentaethylenehexamine (PEHA), N-ethylaminopiperazine (N-EAP), (3(4),8(9)bis(aminomethyl) dicyclo[5.2.1.0$^{2,8}$]decane (mixture of isomers, tricyclic primary amines; TCD-diamine), 1,14-diamino-4,11-dioxatetradecane, dipropylenetriamine, 2-methyl-1,5-pentanediamine, N,N'-dicyclohexyl-1,6-hexanediamine, N, N'-dimethyl-1,3-diaminopropane, N,N'-diethyl-1,3-diaminopropane, N,N-dimethyl-1,3-diaminopropane, secondary polyoxypropylenedi- and triamines, 2,5-diamino-2,5-dimethylhexane, bis(amino-methyl)tricyclopentadiene, 1,8-diamino-p-menthane, bis(4-amino-3,5-dimethylcyclohexyl)methane, 1,3-bis(aminomethyl)cyclohexane (1,3-BAC), dipentylamine, N-2-(aminoethyl)piperazine (N-AEP), N-3-(aminopropyl)piperazine, piperazine and methylcyclohexyl diamine (MCDA).

The amines can be used both individually and in a mixture of two or more of the specified amines.

The Mannich bases used in the curing composition according to the invention in combination with the above-described amines which are reactive to epoxy groups are the reaction products of an amine and an aldehyde with a phenolic compound selected from the group consisting of phenol, pyrocatechol, resorcinol, hydroquinone, hydroxyhydroquinone, phloroglucinol, pyrogallol, o-cresol, m-cresol, p-cresol, bisphenols such as bisphenol F or bisphenol A, and combinations thereof.

In order to form the Mannich base, the phenolic compound is reacted with a preferably primary or secondary amine and an aldehyde or an aldehyde precursor which results in an aldehyde as a result of decomposition. The aldehyde or the aldehyde precursor may advantageously be added to the reaction mixture as an aqueous solution, in particular at an elevated temperature of from approximately 50° C. to 90° C., and reacted with the amine and the phenolic compound.

Phenol or a styrenated phenol, resorcinol, styrenated resorcinol, bisphenol A or bisphenol F are preferably used as the phenolic compound for forming the Mannich base, with phenol or a styrenated phenol, styrenated resorcinol or bisphenol A particularly preferably being used.

The aldehyde used to form the Mannich base is preferably an aliphatic aldehyde, particularly preferably formaldehyde. Trioxane or paraformaldehyde, which decompose to form formaldehyde by being heated in the presence of water, can preferably be used as an aldehyde precursor.

The amine used for reacting with the aldehyde and the phenolic compound so as to form the Mannich base is preferably one of the above-mentioned amines which are reactive to epoxy groups, and preferably 1,3-benzenedimethanamine (mXDA), 3-aminomethyl-3,5,5-trimethylcyclohexane (IPDA), 1,3-bis(aminomethyl)cyclohexane (1,3-BAC), iaminodicyclohexyl methane (PACM), methylcyclohexyl diamine (mCDA) and 5-(aminomethyl) bicyclo[[2.2.1]hept-2-yl]methylamine (NBDA). The amine is preferably present in excess, such that the Mannich base has free amino groups.

The amine used for reacting with the aldehyde and the phenolic compound so as to form the Mannich base can also be an aminosilane selected from the group consisting of 3-aminoalkyltrialkoxysilanes, such as 3-aminopropyl-tri(m)ethoxysilane, 3-aminoalkylalkyl dialkoxysilane, such as 3-aminopropylmethyldi(m)ethoxysilane, N-(aminoalkyl)-3-aminoalkyltrialkoxysilanes, such as N-(2-aminoethyl)-3-aminopropyltri(m)ethoxysilane, N-(aminoalkyl)-3-aminoalkyl-alkyldialkoxysilanes such as N-(2-aminoethyl)-3-aminopropylmethyldi(m)ethoxysilane, 3-[2-(2-aminoethylamino)ethylamino]propyltri(m)ethoxysilane, bis-(gamma-trimethoxysilylpropyl)amine, or mixtures thereof; or also selected from the group consisting of N-cyclohexyl-3-aminopropyltri(m)ethoxysilane, N-cyclohexylaminomethylmethyldiethoxysilane, N-cyclohexylaminomethyltriethoxysilane, 3-ureidopropyltri(m)ethoxysilane, N-methyl[3-(trimethoxysilyl)-propylcarbamate, N-trimethoxysilylmethyl-O-methylcarbamate and N-dimethoxy(methyl)silylmethyl-O-methylcarbamate.

According to the invention, the curing composition contains at least one salt (S) as an accelerator. According to the invention, the salt (S) is at least one salt selected from the group consisting of salts of nitric acid, salts of nitrous acid, salts of halogens, salts of trifluoromethanesulfonic acid and combinations thereof. The salt (S) is preferably at least one salt selected from the group consisting of salts of nitric acid, salts of halogens, salts of trifluoromethanesulfonic acid and combinations thereof. It has been found to be particularly preferable for the salt (S) to be selected from the group consisting of nitrates ($NO_3^-$), iodides ($I^-$), triflates ($CF_3SO_3^-$) and combinations thereof.

Alkali metal nitrates, alkaline earth metal nitrates, lanthanide nitrates, aluminum nitrate, ammonium nitrate and mixtures thereof are particularly suitable salts of nitric acid. Corresponding salts of nitric acid are commercially available. Alkali metal nitrates and/or alkaline earth metal nitrates, such as $Ca(NO_3)_2$ or $NaNO_3$, are preferably used as salts of nitric acid. It is also possible to use a solution of a salt in nitric acid as salt (S), for example a solution containing $Ca(NO_3)_2/HNO_3$. To prepare this solution, $CaCO_3$ is dissolved in $HNO_3$.

Alkali metal nitrites, alkaline earth metal nitrites, lanthanide nitrites, aluminum nitrite, ammonium nitrite and mixtures thereof are particularly suitable salts of nitrous acid. Corresponding salts of nitrous acid are commercially available. Alkali metal nitrites and/or alkaline earth metal nitrites, such as $Ca(NO_2)_2$, are preferably used as salts of nitrous acid.

Alkali metal halides, alkaline earth metal halides, lanthanide halides, aluminum halides, ammonium halides and mixtures thereof are particularly suitable salts of halogens. Corresponding salts of halogens are commercially available. The halogens are preferably selected from the group consisting of chloride, bromide, iodide and mixtures thereof, iodides being particularly preferably used.

Alkali metal triflates, alkaline earth metal triflates, lanthanide triflates, aluminum triflates, ammonium triflates and mixtures thereof are particularly suitable salts of trifluoromethanesulfonic acid. Corresponding salts of trifluoromethanesulfonic acid are commercially available. Alkali metal nitrates and/or alkaline earth metal nitrates, such as $Ca(CF_3SO_3)_2$, are preferably used as salts of trifluoromethanesulfonic acid.

In principle, the cations of the salt (S) can be organic, inorganic or a mixture thereof. The cation of the salt (S) is preferably an inorganic cation.

Suitable organic cations are, for example, ammonium cations substituted with organic groups, such as $C_1$-$C_6$-alkyl groups, such as tetraethylammonium cations.

Suitable inorganic cations of the salt (S) are preferably cations selected from the group consisting of alkali metals, alkaline earth metals, lanthanides, aluminum, ammonium ($NH_4^+$) and mixtures thereof, more preferably from the group consisting of alkali metals, alkaline earth metals, aluminum, ammonium and mixtures thereof, and even more preferably from the group consisting of alkali metals, alkaline earth metals, aluminum and mixtures thereof. It is particularly preferable for the cation of the salt (S) to be selected from the group consisting of sodium, calcium, aluminum, ammonium and mixtures thereof.

The following compounds or components are therefore particularly suitable as salt (S): $Ca(NO_3)_2$ (calcium nitrate, usually used as $Ca(NO_3)_2$ tetrahydrate), a mixture of $Ca(NO_3)_2/HNO_3$, $KNO_3$ (potassium nitrate), $NaNO_3$ (sodium nitrate), $Mg(NO_3)_2$ (magnesium nitrate, usually used as $Mg(NO_3)_2$ hexahydrate), $Al(NO_3)_3$ (aluminum nitrate, usually used as $Al(NO_3)_3$ nonahydrate), $NH_4NO_3$ (ammonium nitrate), $Ca(NO_2)_2$ (calcium nitrite), $NaCl$ (sodium chloride), $NaBr$ (sodium bromide), $NaI$ (sodium iodide), $Ca(CF_3SO_3)_2$ (calcium triflate), $Mg(CF_3SO_3)_2$ (magnesium triflate), and $Li(CF_3SO_3)_2$ (lithium triflate).

The curing composition according to the invention can comprise one or more salts (S). The salts can be used both individually and in a mixture of two or more of the specified salts.

In order to improve the solubility properties of the salt (S) in the curing composition, the salt (S) can be dissolved in a suitable solvent and used accordingly as a solution. Organic solvents such as methanol, ethanol and glycerol, for example, are suitable for this purpose. However, water can also be used as the solvent, possibly also in a mixture with the above-mentioned organic solvents. In order to prepare the corresponding salt solutions, the salt (S) is added to the solvent and stirred, preferably until it is completely dissolved.

The salt (S) is preferably contained in the curing composition in a proportion of from 0.1 to 15 wt. %, based on the total weight of the curing composition. The salt (S) is preferably contained in the curing composition in a proportion of from 0.5 to 12 wt. %, more preferably in a proportion of from 1.0 to 10.0 wt. %, even more preferably in a proportion of from 1.5 to 8.0 wt. %, based on the total weight of the curing composition.

The amine which is reactive to epoxy groups is preferably contained in the curing composition in a proportion of from 10 to 90 wt. %, particularly preferably from 35 to 70 wt. %, based on the total weight of the curing composition. Furthermore, the curing composition preferably contains the at least one Mannich base in a proportion of from 4 to 70 wt. %, particularly preferably from 12 to 65 wt. %, in each case based on the weight of the curing composition.

In a further embodiment, the curing composition comprises further additives from the group of solvents, co-accelerators, adhesion promoters and inorganic fillers.

Non-reactive diluents (solvents) can preferably be contained in an amount of up to 30 wt. %, based on the total weight of the curing composition, for example in an amount of from 1 to 20 wt. %. Examples of suitable solvents are alcohols, such as methanol, ethanol or glycol, lower alkyl ketones such as acetone, di-lower alkyl-lower alkanoyl amides such as dimethylacetamide, lower alkyl benzenes such as xylenes or toluene, phthalic acid esters or paraffins. The amount of solvents is preferably ≤5 wt. %, based on the total weight of the curing composition.

Benzene alcohol, tertiary amines, imidazoles or tertiary aminophenols, organophosphines, Lewis bases or acids such as phosphoric acid esters, or mixtures of two or more thereof, can be used as co-accelerators, for example. The co-accelerators may also be present in the epoxy resin component (A) if they are compatible with the epoxy resins.

The co-accelerators are preferably contained in the curing composition in a weight proportion of from 0.001 to 5 wt. %, based on the total weight of the curing composition.

Examples of suitable co-accelerators are in particular tris-2,4,6-dimethylaminomethylphenol, 2,4,6-tris(dimethylamino)phenol and bis[(dimethylamino)methy]phenol. A suitable co-accelerator mixture contains 2,4,6-tris(dimethylaminomethyl)phenol and bis(dimethylaminomethyl)phenol. Mixtures of this kind are commercially available, for example as Ancamine® K54 (Evonik, Germany).

By using an adhesion promoter, the cross-linking of the borehole wall with the mortar compound is improved such that the adhesion increases in the cured state. Suitable adhesion promoters are selected from the group of silanes that have at least one Si-bound hydrolyzable group, such as 3-glycidoxypropyltrimethoxysilane, 3-glycidoxypropyltriethoxysilane, 2-(3,4-epoxycyclohexyl)ethyltrimethoxysilane, N-2-(aminoethyl)-3-aminopropylmethyl-diethoxysilane, N-2-(aminoethyl)-3-aminopropyltriethoxysilane, 3-aminopropyl-trimethoxysilane, 3-aminopropyltriethoxysilane, N-phenyl-3-aminoethyl-3-aminopropyl-trimethoxysilane, 3-mercaptopropyltrimethoxysilane and 3-mercaptopropylmethyldimethoxysilane. In particular, 3-aminopropyltrimethoxysilane (AMMO), 3-aminopropyltriethoxysilane (AMEO), 2-aminoethyl-3-aminopropyltrimethoxysilane (DAMO) and trimethoxysilylpropyldiethylenetetramine (TRIAMO) are preferred as adhesion promoters. Further silanes are described, for example, in EP3000792 A1, the content of which is hereby incorporated in the present application.

The adhesion promoter can be contained in an amount of up to 10 wt. %, preferably from 0.1 to 5 wt. %, more preferably from 1.0 to 2.5 wt. %, based on the total weight of the curing composition.

Inorganic fillers, in particular cements such as Portland cement or aluminate cement and other hydraulically setting inorganic substances, quartz, glass, corundum, porcelain, earthenware, baryte, light spar, gypsum, talc and/or chalk and mixtures thereof are used as fillers. In addition, thickeners such as fumed silica can also be used as an inorganic filler. Particularly suitable fillers are quartz powders, fine quartz powders and ultra-fine quartz powders that have not been surface-treated, such as Millisil W3, Millisil W6, Millisil W8 and Millisil W12, preferably Millisil W12. Silanized quartz powders, fine quartz powders and ultra-fine quartz powders can also be used. These are commercially available, for example, from the Silbond product series from Quarzwerke. The product series Silbond EST (modified with epoxysilane) and Silbond AST (treated with aminosilane) are particularly preferred. Furthermore, fillers based on aluminum oxide such as aluminum oxide ultra-fine filler of the ASFP type from Denka, Japan ($d_{50}$=0.3 μm) or grades such as DAW or DAM with the type designations 45 ($d_{50}$<0.44 μm), 07 ($d_{50}$>8.4 μm), 05 ($d_{50}$<5.5 μm) and 03 ($d_{50}$<4.1 μm). Moreover, the surface-treated fine and ultra-fine fillers of the Aktisil AM type (treated with aminosilane, $d_{50}$=2.2 μm) and Aktisil EM (treated with epoxysilane, d50=2.2 μm) from Hoffman Mineral can be used.

The inorganic fillers can be added in the form of sands, flours, or molded bodies, preferably in the form of fibers or balls. The fillers can be present in one or all components of the multi-component epoxy resin system described below. A suitable selection of the fillers with regard to type and particle size distribution/(fiber) length can be used to control application-relevant properties such as rheological behavior, press-out forces, internal strength, tensile strength, pull-out forces and impact strength.

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the curing composition.

The present invention further relates to an epoxy resin compound which comprises at least one curable epoxy resin and a curing composition as described above. The epoxy resin compound is preferably a multi-component epoxy resin compound, more preferably a two-component epoxy resin compound.

A large number of the compounds known to a person skilled in the art and commercially available for this purpose which contain on average more than one epoxy group, preferably two epoxy groups, per molecule can be used as a curable epoxy resin in the epoxy resin component (A). These epoxy resins may be both saturated and unsaturated as well as aliphatic, alicyclic, aromatic or heterocyclic, and may also have hydroxyl groups. They may also contain substituents which do not cause disruptive secondary reactions under the mixing or reaction conditions, for example alkyl or aryl substituents, ether groups and the like. Trimeric and tetrameric epoxides are also suitable in the context of the invention.

The epoxy resins are preferably glycidyl ethers which are derived from polyhydric alcohols, in particular from polyhydric phenols such as bisphenols and novolacs, in particular those having an average glycidyl group functionality of 1.5 or greater, in particular 2 or greater, for example from 2 to 10.

The epoxy resins can have an epoxy equivalent weight (EEW) of from 120 to 2000 g/EQ, preferably from 140 to 400, in particular from 155 to 195, for example from 165 to 185. Mixtures of a plurality of epoxy resins may also be used.

Examples of the polyhydric phenols used to prepare the epoxy resins are resorcinol, hydroquinone, 2,2-bis-(4-hydroxyphenyl)propane (bisphenol A), isomer mixtures of dihydroxyphenylmethane (bisphenol F), tetrabromobisphenol A, novolacs, 4,4'-dihydroxyphenylcyclohexane and 4,4'-dihydroxy-3,3'-dimethyldiphenylpropane.

The epoxy resin is preferably a diglycidyl ether of bisphenol A or bisphenol F or a mixture thereof. Liquid diglycidyl ethers based on bisphenol A and/or F having an EEW of from 180 to 190 g/EQ are particularly preferably used.

Further examples are hexanediol diglycidyl ether, trimethylolpropane triglycidyl ether, bisphenol A epichlorohydrin resins and/or bisphenol F epichlorohydrin resins, for example having an average molecular weight of $Mn \leq 2000$ g/mol.

The present invention further relates to a multi-component epoxy resin system comprising an epoxy resin component (A) and a curing component, the epoxy resin component (A) containing a curable epoxy resin, and the curing component comprising at least one Mannich base and an amine which is reactive to epoxy groups, the Mannich base being obtainable by reacting a phenolic compound selected from the group consisting of phenol, styrenated phenol, pyrocatechol, resorcinol, hydroquinone, hydroxyhydroquinone, phloroglucinol, pyrogallol, o-cresol, m-cresol, p-cresol and bisphenols with an aldehyde or an aldehyde precursor and an amine having at least two active hydrogen atoms in the molecule which are bonded to a nitrogen atom. The multi-component epoxy resin system also comprises at least one salt (S) selected from salts of nitric acid, salts of nitrous acid, salts of halogens, salts of trifluoromethanesulfonic acid and combinations thereof in the epoxy resin component (A) and/or in the curing component. The multi-component epoxy resin system is preferably a two-component epoxy resin system.

The above statements apply to the curable epoxy resin, the Mannich base, the amine which is reactive to epoxy groups and the salt (S) of the multi-component epoxy resin system.

The salt (S) used as an accelerator can be contained in the epoxy resin component (A) or in the curing component or in both the epoxy resin component (A) and the curing component. It is preferable for the salt (S) to be contained at least in the curing component, preferably only in the curing component. In this case, the curing composition described above is used in the multi-component epoxy resin system.

The proportion of epoxy resin in the epoxy resin component (A) is >0 to 100 wt. %, preferably from 10 to 70 wt. % and particularly preferably from 30 to 60 wt. %, based on the total weight of the resin component (A).

In addition to the epoxy resins, the epoxy resin component (A) may optionally contain at least one reactive diluent. Glycidyl ethers of aliphatic, alicyclic or aromatic monoalcohols or in particular polyalcohols having a lower viscosity than epoxides containing aromatic groups are used as reactive diluents. Examples of reactive diluents are monoglycidyl ethers, e.g. o-cresyl glycidyl ether, and glycidyl ethers having an epoxy functionality of at least 2, such as 1,4-butanediol diglycidyl ether (BDDGE), cyclohexanedimethanol diglycidyl ether and hexanediol diglycidyl ether, as well as tri- or higher glycidyl ethers, such as glycerol triglycidyl ether, pentaerythritol tetraglycidyl ether, trimethylolpropane triglycidyl ether (TMPTGE), or trimethylolethane triglycidyl ether (TMETGE), with trimethylolethane triglycidyl ether being preferred. Mixtures of two or more of these reactive diluents can also be used, preferably mixtures containing triglycidyl ethers, particularly preferably as a mixture of 1,4-butanediol diglycidyl ether (BDDGE) and trimethylolpropane triglycidyl ether (TMPTGE) or 1,4-butanediol diglycidyl ether (BDDGE) and trimethylolethane triglycidyl ether (TMETGE).

The reactive diluents are preferably present in an amount of from 0 to 60 wt. %, in particular from 1 to 20 wt. %, based on the total weight of the resin component (A).

The proportion of the epoxy component (A) in the total mass of the multi-component epoxy resin system is preferably from 5 to 90 wt. %, in particular from 20 to 80 wt. %, from 30 to 70 wt. % or from 40 to 60 wt. %.

Suitable epoxy resins and reactive diluents can also be found in the standard reference from Michael Dombusch, Ulrich Christ and Rob Rasing, "Epoxidharze," Vincentz Network GmbH & Co KG (2015), ISBN 13: 9783866308770. These compounds are included here by reference.

Furthermore, the epoxy resin component (A) can contain conventional additives, in particular adhesion promoters and fillers, as already described for the curing composition.

The adhesion promoter can be contained in an amount of up to 10 wt. %, preferably from 0.1 to 5 wt. %, particularly preferably from 1.0 to 5.0 wt. %, based on the total weight of the epoxy resin component (A).

The proportion of fillers is preferably from 0 to 75 wt. %, for example from 10 to 75 wt. %, preferably from 15 to 75 wt. %, more preferably from 20 to 50 wt. %, and even more preferably from 25 to 40 wt. %, based on the total weight of the epoxy resin component (A).

Further conceivable additives to the epoxy resin component (A) are also thixotropic agents such as optionally organically after-treated fumed silica, bentonites, alkyl- and methylcelluloses and castor oil derivatives, plasticizers such as phthalic or sebacic acid esters, stabilizers, antistatic agents, thickeners, flexibilizers, hardening catalysts, rheology aids, wetting agents, coloring additives such as dyes or pigments, for example for different staining of components for improved control of their mixing, as well as wetting agents, desensitizing agents, dispersants and other control agents for the reaction rate, or mixtures of two or more thereof.

The multi-component epoxy resin system is preferably present in cartridges or film pouches which are characterized in that they comprise two or more separate chambers in which the epoxy resin component (A) and the curing component are separately arranged so as to prevent a reaction.

For the use as intended of the multi-component epoxy resin system, the epoxy resin component (A) and the curing component are discharged out of the separate chambers and mixed in a suitable device, for example a static mixer or dissolver. The mixture of epoxy resin component (A) and curing component is then introduced into the previously cleaned borehole by means of a known injection device. The component to be fixed is then inserted into the mortar compound and aligned. The reactive constituents of the curing component react with the epoxy resins of the resin component (A) by polyaddition such that the epoxy resin compound cures under environmental conditions within a desired period of time, preferably within minutes or hours.

Components A and B are preferably mixed in a ratio that results in a balanced stoichiometry according to the EEW and AHEW values.

The AHEW value (amine hydrogen equivalent weight, H equivalent) provides the amount of the curing composition which contains 1 mol of reactive H. The AHEW is determined in a manner known to a person skilled in the art on the basis of the formulation of the reaction mixture from the known H equivalents of the used reactants and raw materials from which they are calculated.

Using the example of meta-xylylenediamine ($M_w$=136 g/mol, functionality=4 eq/mol), the calculation of the AHEW is explained below by way of example:

$$AHEW = \frac{M_w}{\text{Functionality}} = \frac{136}{4} \left[\frac{g}{eq}\right] = 34 \left[\frac{g}{eq}\right] \quad \text{General formula}$$

The EEW (epoxide equivalent weight, epoxide equivalent values) are generally provided by the manufacturers of the epoxy resin components used in each case or are calculated according to known methods. The EEW values provide the amount in g of epoxy resin which contains 1 mol of epoxy groups.

Experimentally, the AHEW was obtained by determining the glass transition temperature (Tg) from a mixture of epoxy resin (with known EEW) and an amine component. In this case, the glass transition temperatures of epoxy resin/amine mixtures were determined with different ratios. The sample was cooled at a heating rate of −20 K/min from 21 to −70° C., heated in a first heating cycle to 250° C. (heating rate 10 K/min), then re-cooled to −70° C. (heating rate −20 K/min) and heated (20 K/min) to 200° C. in the last step. The mixture having the highest glass transition temperature in the second heating cycle ("$T_g2$") has the optimum ratio of epoxy resin and amine. The AHEW value can be calculated from the known EEW and the optimum epoxy resin/amine ratio.

Example: EEW=158 g/mol
Amine/epoxy resin mixture having a maximum $T_g2$: 1 g amine with 4.65 g epoxy resin $$AHEW = \frac{1}{4.65} \cdot 158 = 34 \left[\frac{g}{eq}\right]$$

The epoxy resin compound according to the invention or the mufti-component epoxy resin system according to the invention is preferably used for construction purposes. The expression "for construction purposes" refers to the structural adhesion of concrete/concrete, steel/concrete or steel/steel or one of said materials with other mineral materials, to structural strengthening of components made of concrete, brickwork and other mineral materials, to reinforcement applications with fiber-reinforced polymers of building objects, to chemical fastening of surfaces made of concrete, steel or other mineral materials, in particular chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. Most particularly preferably, the epoxy resin compounds according to the invention and the multi-component epoxy resin systems according to the invention are used for chemically fastening anchoring means.

The present invention also relates to a method for the chemical fastening of construction elements in boreholes, an epoxy resin compound according to the invention or a multi-component epoxy resin system being used as described above for the chemical fastening of the construction elements. The method according to the invention is particularly suitable for the structural adhesion of concrete/concrete, steel/concrete or steel/steel or one of said materials with other mineral materials, for structural strengthening of components made of concrete, brickwork and other mineral materials, for reinforcement applications with fiber-reinforced polymers of building objects, for chemical fastening of surfaces made of concrete, steel or other mineral materials, in particular chemical fastening of construction elements and anchoring means, such as anchor rods, anchor bolts, (threaded) rods, (threaded) sleeves, reinforcing bars, screws and the like, in boreholes in various substrates, such as (reinforced) concrete, brickwork, other mineral materials, metals (e.g. steel), ceramics, plastics, glass, and wood. The method according to the invention is very particularly preferably used for the chemical fastening of anchoring means.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound for the chemical fastening of construction elements, in particular for anchoring fastening elements in boreholes. The epoxy resin compound comprises at least one Mannich base and an amine which is reactive to epoxy groups, the Mannich base being obtainable by reacting a phenolic compound selected from the group consisting of phenol, styrenated phenol, pyrocatechol, resorcinol, hydroquinone, hydroxyhydroquinone, phloroglucinol, pyrogallol, o-cresol, m-cresol, p-cresol and bisphenols with an aldehyde or an aldehyde precursor and an amine having at least two active hydrogen atoms in the molecule which are bonded to a nitrogen atom. It is preferable for the epoxy resin compound to be in the form of a multi-component epoxy resin system which comprises the epoxy resin component (A) described above and the curing component. It is also preferable for the salt (S) to be contained in the curing component and thus for a curing composition (B) to be used as described above.

The use of at least one salt (S) within the meaning of the present invention as an accelerator in an epoxy resin compound, in particular in a multi-component epoxy resin system, makes it possible to considerably shorten the curing time of the epoxy resin compound and furthermore to ensure sufficient pull-out strength after only four to six hours. Furthermore, the cured epoxy resin compound has excellent pull-out strength at elevated temperatures and in the water-filled borehole.

The present invention also relates to the use of at least one salt (S) selected from the group consisting of salts of nitric acid, salts of nitrous acid, salts of halogens, salts of trifluoromethanesulfonic acid and combinations thereof as an accelerator in an epoxy resin compound, in particular in a multi-component epoxy resin system. The epoxy resin compound comprises at least one Mannich base and an amine which is reactive to epoxy groups, the Mannich base being obtainable by reacting a phenolic compound selected from the group consisting of phenol, styrenated phenol, pyrocatechol, resorcinol, hydroquinone, hydroxyhydroquinone, phloroglucinol, pyrogallol, o-cresol, m-cresol, p-cresol and bisphenols with an aldehyde or an aldehyde precursor and an amine having at least two active hydrogen atoms in the molecule which are bonded to a nitrogen atom. It is preferable for the epoxy resin compound to be in the form of a multi-component epoxy resin system which comprises the epoxy resin component (A) and curing component described above. It is also preferable for the salt (S) to be contained in the curing component and thus for a curing composition (B) to be used as described above.

The use of at least one salt (S) within the meaning of the present invention as an accelerator in an epoxy resin compound, in particular in a multi-component epoxy resin compound and more preferably in the curing component of the multi-component epoxy resin compound makes it possible in particular to increase the pull-out strength of the epoxy resin compound at elevated temperatures, for example in a temperature range of from 35° C. to 50° C.

Furthermore, the use of at least one salt (S) within the meaning of the present invention as an accelerator in an epoxy resin compound, in particular in a multi-component epoxy resin compound and more preferably in the curing component of the multi-component epoxy resin compound, makes it possible to increase the pull-out strength of the epoxy resin compounds in water-filled boreholes.

Further advantages of the invention can be found in the following description of preferred embodiments, which are not understood to be in any way limiting, however. All embodiments of the invention can be combined with one another within the scope of the invention.

EXAMPLES

Epoxy Resin Component (A)

Starting Materials

In the examples, the bisphenol A-based and bisphenol F-based epoxy resins commercially available under the names Araldite GY 240 and Araldite 282 (Huntsman), respectively, were used as the epoxy resins.

The 1,4-butanediol-diglycidyl ether and trimethylpropane-triglycidyl ether commercially available under the names Araldite DY-026 and Araldite™ DY-T (Huntsman), respectively, were used as reactive diluents.

3-glycidyloxypropyl-trimethoxysysilane available under the name Dynalsylan GLYMO™ (Evonik Industries) was used as the adhesion promoter.

The liquid components were premixed by hand. Subsequently, quartz (Millisil™ W12 from Quarzwerke Frechen) was added as a filler and fumed silica (Cab-O-Sil™ TS-720 from Cabot Rheinfelden) was added as a thickener and the mixture was stirred in a dissolver (PC laboratory system, volume 1 L) for 10 minutes at a negative pressure of 80 mbar at 3500 rpm.

The composition of the epoxy resin components A used in the examples is given in table 1 below.

TABLE 1

Composition of the epoxy resin component A in wt. % (EEW 255 g/EQ)

| Substance | Function | Wt. % |
|---|---|---|
| 3-glycidyloxypropyltrimethoxysilane | Adhesion promoter | 2.8 |
| Bisphenol A-based epoxy resin | Epoxy resin | 31.4 |
| Bisphenol F-based epoxy resin | Epoxy resin | 16.7 |
| 1,4-butanediol-diglycidyl ether | Reactive diluent | 6.0 |
| Trimethyolpropane-triglycidyl ether | Reactive diluent | 6.0 |
| Quartz | Filler | 34.4 |
| Silicic acid | Thickener | 2.7 |

Curing Composition (B)

The Mannich bases commercially available under the name Epikure Curing Agent 132 (mXDA-bisphenol A-based Mannich base in mXDA from Momentive Specialty Chemicals, NL) were used as Mannich bases. Furthermore, a mXDA-resorcinol-based Mannich base in mXDA, an mXDA-phenol-based Mannich base in mXDA and an IPDA-phenol-based Mannich base in IPDA were prepared. Methods for preparing the Mannich bases are described in EP0645408 A1.

m-xylylenediamine (mXDA) and 1,3-cyclohexanedimethanamine (1,3-BAC) from Mitsubishi Gas Chemical, Japan, and isophorone diamine (IPDA) from Evonik Degussa, Germany, were used as amines for the preparation of the curing composition (B).

3-aminopropyl-triethoxysilane, which is available under the trade name Dynasylan AMEO from Evonik Degussa, was used as an adhesion promoter.

Quartz (Millisil™ W12 from Quarzwerke Frechen) and calcium aluminate cement (Secar 80 from Kerneos SA) were used as a filler and fumed silica (Cab-O-Sil™ TS-720 from Cabot Rheinfelden) was used as a thickener.

The constituents given in table 2 below were used to prepare the salts (S) used in the curing composition B.

TABLE 2

Salts (S) used as accelerators

| Salt (S) | Trade name | Manufacturer |
|---|---|---|
| Calcium nitrate | Calcium nitrate tetrahydrate | Sigma-Aldrich |
| Sodium iodide | Sodium iodide | Sigma-Aldrich |
| Calcium triflate | Calcium trifluoromethanesulfonate | Sigma-Aldrich |

The salts calcium nitrate and sodium iodide were used as solutions in glycerol (1,2,3-propanetriol, CAS No. 56-81-5, Merck. D). To prepare the calcium nitrate solution, 400.0 g calcium nitrate tetrahydrate was added to 100.0 g glycerol and stirred at 50° C. until completely dissolved (3 hours). The solution prepared in this way contained 80.0% calcium nitrate tetrahydrate. To prepare the sodium iodide solution, 36.4 g sodium iodide was added to 63.6 g glycerol and stirred until completely dissolved. The solution prepared in this way contained 36.4% sodium iodide.

Calcium triflate was dissolved as a solid in the amine of the particular curing agent.

Examples 1 to 8

The liquid components were mixed to prepare the curing compositions (B). The accelerator was added and quartz powder and silicic acid were then added and stirred in a dissolver (PC laboratory system, volume 1 L) for 10 minutes at a negative pressure of 80 mbar at 3500 rpm.

The composition of the curing compositions (B) prepared in this way is given in table 3 below:

TABLE 3

Composition of the curing compositions (B) in wt. % (examples 1 to 10)

| | | Example | | | | | | | | | |
|---|---|---|---|---|---|---|---|---|---|---|---|
| | | 1 | 2 | 3 | 4 | 5 | 6 | 7 | 8 | 9 | 10 |
| Mannich base/amine | mXDA-resorcinol-based Mannich base/mXDA | 54.2 | 55.0 | 49.7 | — | — | — | — | — | — | — |
| | mXDA-bisphenol A-based Mannich base/mXDA | — | — | — | 54.2 | 55.0 | 49.7 | — | — | — | — |
| | mXDA-phenol-based Mannich base/mXDA | — | — | — | — | — | — | 40.0 | 38.0 | — | — |
| | IPDA-phenol-based Mannich base/IPDA | — | — | — | — | — | — | — | — | 40.0 | 38.0 |
| Amine | mXDA | — | — | — | — | — | — | 14.2 | — | — | — |
| | IPDA | — | — | — | — | — | — | — | 13.7 | — | 13.7 |
| | 1,3-BAC | — | — | — | — | — | — | — | — | 13.0 | — |
| Salt (S) | Calcium nitrate | 3.8 | — | — | 3.8 | — | — | 3.8 | 6.3 | 5.0 | 6.3 |
| | Sodium iodide | — | — | 8.3 | — | — | 8.3 | — | — | — | — |
| | Calcium triflate | — | 3.0 | — | — | 3.0 | — | — | — | — | — |
| | Adhesion promoter | 2.0 | 2.0 | 2.0 | 2.0 | 2.0 | 2.0 | 2.0 | 2.0 | 2.0 | 2.0 |
| | Quartz | 37.3 | 37.3 | 37.3 | 37.3 | 37.3 | 37.3 | 37.3 | 37.3 | 37.3 | 37.3 |
| | Thickener | 2.7 | 2.7 | 2.7 | 2.7 | 2.7 | 2.7 | 2.7 | 2.7 | 2.7 | 2.7 |
| | AHEW [g/Eq] | 87 | 86 | 95 | 96 | 95 | 105 | 98 | 111 | 94 | 102 |

Comparative Examples 1 and 3

The liquid components were mixed to prepare the curing compositions (B) of the comparative examples. The accelerator was added and quartz powder and silicic acid were then added and stirred in a dissolver (PC laboratory system, volume 1 L) for 10 minutes at a negative pressure of 80 mbar at 3500 rpm. The commercially available accelerator Ancamin K54 (2,4,6-tris(dimethylaminomethyl)phenol, bis[(dimethylamino)methyl]phenol) from Evonik was used as the accelerator.

The composition of the curing compositions (B) prepared in this way is given in table 4 below:

TABLE 4

Composition of the curing compositions (B) in wt. % (comparative examples 1 to 7)

| | | Example | | | | | | |
|---|---|---|---|---|---|---|---|---|
| | | 1 | 2 | 3 | 4 | 5 | 6 | 7 |
| Mannich base/amine | mXDA-resorcinol-based Mannich base/mXDA | 55.0 | — | — | — | — | — | — |
| | mXDA-bisphenol A-based Mannich base/mXDA | — | 55.0 | — | — | — | — | — |
| | mXDA-phenol-based Mannich base/mXDA | — | — | 40.0 | 40.0 | — | — | — |
| | IPDA-phenol-based Mannich base/IPDA | — | — | — | — | 40.0 | 40.0 | — |
| Amine | mXDA | — | — | 15.0 | — | — | — | 41.2 |
| | IPDA | — | — | — | 15.0 | — | 15.0 | — |
| | 1,3-BAC | — | — | — | — | 15.0 | — | — |
| Accelerator | Ancamin K54 | 3.0 | 3.0 | 3.0 | 3.0 | 3.0 | 3.0 | — |
| | Calcium nitrate | — | — | — | — | — | — | 3.8 |
| | Adhesion promoter | 2.0 | 2.0 | 2.0 | 2.0 | 2.0 | 2.0 | — |
| | Quartz | 37.3 | 37.3 | 37.3 | 37.3 | 37.3 | 37.3 | 25.0 |
| | Thickener | 2.7 | 2.7 | 2.7 | 2.7 | 2.7 | 2.7 | 5.0 |
| | Calcium aluminate cement | — | — | — | — | — | — | 25.0 |
| | AHEW [g/Eq] | 86 | 95 | 95 | 104 | 89 | 95 | 83 |

Mortar Compounds and Pull-Out Tests

The epoxy resin component (A) and the curing composition (B) were mixed in a speed mixer in a ratio resulting in a balanced stoichiometry according to the EEW and AHEW values. The mixture was poured into a one-component cartridge as far as possible without bubbles, and was immediately injected into the borehole made for the pull-out tests.

The pull-out strength of the mortar compounds obtained by mixing the epoxy resin component (A) and curing composition (B) according to the above examples was determined using a high-strength anchor threaded rod M12 according to ETAG 001 Part 5, which was doweled into a hammer-drilled borehole having a diameter of 14 mm and a borehole depth of 69 mm by means of the relevant mortar compound in C20/25 concrete. The boreholes were cleaned by means of compressed air (2×6 bar), a wire brush (2×) and again by compressed air (2×6 bar).

The boreholes were filled up, by two thirds from the bottom of the borehole, with the mortar compound to be tested in each case. The threaded rod was pushed in by hand. The excess mortar was removed using a spatula.

The curing time in test 1 was 4 h at 21° C. In test 2, the curing time was 6 hours at 21° C. In test 3, the curing time was 24 hours at 21° C. In test 4, the curing time was 24 hours at 25° C., followed by storage at 80° C. for 24 hours. The pull-out test was carried out at 80° C.

In test 5 (Fic), the borehole was filled with water after being drilled and cleaned (once by being blown out with compressed air (6 bar), once using a brush and then once again by being blown out with compressed air (6 bar)). The mortar was injected into the water-filled borehole via a mixer extension comprising a piston plug. The curing time of the mortar was 48 hours at 25° C.

The failure load was determined by centrally pulling out the anchor threaded rod with a narrow support. The load values obtained with the mortar compounds using a curing composition (B) according to examples 1 to 8 and comparative examples 1 to 5 are shown in table 5 below.

TABLE 5

Determination of the load values of examples 1 to 10 according to the invention

| Pull-out tests | Test Number | Examples | | | | | | | | | |
| --- | --- | --- | --- | --- | --- | --- | --- | --- | --- | --- | --- |
| | | 1 | 2 | 3 | 4 | 5 | 6 | 7 | 8 | 9 | 10 |
| | | Load value [N/mm$^2$] | | | | | | | | | |
| 4 h curing | 1 | 21.8 | 19.5 | 17.9 | 26.2 | 25.4 | 23.5 | 23.5 | 20.0 | 18.0 | 13.3 |
| 6 h curing | 2 | 25.6 | 27.1 | 25.5 | 30.7 | 29.6 | 30.8 | 32.1 | 28.9 | N/A | N/A |
| 24 h curing | 3 | 33.6 | 34.1 | 33.5 | 33.9 | 33.5 | 33.9 | 36.1 | 36.0 | 38.4 | 37.7 |
| 80° C. | 4 | N/A | N/A | N/A | N/A | NIA | N/A | N/A | N/A | 26.5 | 27.7 |
| F1c | 5 | 22.4 | N/A | N/A | N/A | N/A | N/A | N/A | N/A | 24.9 | 24.5 |

TABLE 6

Determination of the load values of comparative examples 1 to 7

| Pull-out tests | Test Number | Comparative example | | | | | | |
| --- | --- | --- | --- | --- | --- | --- | --- | --- |
| | | 1 | 2 | 3 | 4 | 5 | 6 | 7 |
| | | Load value [N/mm$^2$] | | | | | | |
| 4 h curing | 1 | 2.2 | 7.5 | 0.7 | 0.2 | 0.3 | 0.0 | N/A |
| 6 h curing | 2 | 23.6 | 28.2 | 24.6 | 15.1 | N/A | N/A | N/A |
| 24 h curing | 3 | 34.5 | 33.1 | 38.3 | 35.1 | 37.4 | 36.8 | 38.8 |
| 80° C. | 4 | N/A | N/A | N/A | N/A | N/A | N/A | 23.9 |
| F1c | 5 | N/A | N/A | N/A | N/A | N/A | N/A | 20.6 |

The epoxy resin compounds according to the invention comprising curing compositions according to examples 1 to 8 exhibit much faster curing than the epoxy resin compounds comprising the curing compositions from comparative examples 1 to 4. The mortar compounds prepared using the curing compositions according to the invention can be subjected to loading after just 6 h. This makes it possible to considerably reduce the waiting times before the next work step and to allow follow-up work to be carried out much earlier.

The invention claimed is:

1. A multi-component epoxy resin system, comprising:
an epoxy resin component (A) and a curing component,
wherein the epoxy resin component (A) contains a curable epoxy resin, and the curing component contains at least one Mannich base and at least one amine which is reactive to epoxy groups,
wherein the curable epoxy resin is based on one or more of bisphenol A or bisphenol F,
wherein the at least one Mannich base is obtainable by reacting a phenolic compound selected from one or more of the group consisting of bisphenol A, bisphenol F, resorcinol, and phenol,
with an aldehyde or an aldehyde precursor and an amine having at least two active hydrogen atoms in the molecule which are bonded to a nitrogen atom, and
further comprising at least one salt (S) selected from salts of nitric acid, or salts of trifluoromethanesulfonic acid or combinations thereof contained in the epoxy resin component (A) and/or in the curing component, and
wherein the at least one salt (S) comprises a cation other than ammonium or other than an ammonium cation substituted with an organic group, and
wherein the at least one amine which is reactive to epoxy groups is selected from the group consisting of one or more selected from one or more of the group consisting of mXDA (m-xylylenediamine), IPDA (3-aminomethyl-3,5,5-trimethylcyclohexane), Dytek A (2-methylpentanediamine), TMD (1,6-diamino-2,2,4-trimethylhexane), N-EAP (N-ethylaminopiperazine), MCDA (methylcyclohexyl diamine), and 1,3-BAC (1,3-bis(aminomethyl)cyclohexane).

2. The multi-component epoxy resin system according to claim 1, wherein the at least one salt (S) comprises a cation selected from the group consisting of alkali metals, alkaline earth metals, lanthanoids, aluminum, and combinations thereof.

3. The multi-component epoxy resin system according to claim 1, wherein the aldehyde is an aliphatic aldehyde, and wherein the aldehyde precursor comprises trioxane or paraformaldehyde.

4. The multi-component epoxy resin system according to claim 1, wherein the at least one salt (S) is present in a proportion of from 0.1 to 15 wt. %, based on total weight of the curing composition.

5. The multi-component epoxy resin system according to claim 1, wherein the at least one salt (S) is contained in the curing component.

6. The multi-component epoxy resin system according to claim 1, wherein the aldehyde is formaldehyde and wherein the aldehyde precursor comprises trioxane or paraformaldehyde.

7. A method for the chemical fastening of construction elements in boreholes, the method comprising:
chemical fastening of the construction elements with a multi-component epoxy resin system according to claim 1.

8. A cured compound prepared by curing the multi-component epoxy resin system according to claim 1.

9. The multi-component epoxy resin system according to claim 1, wherein the at least one salt (S) comprises calcium triflate or calcium nitrate, and wherein the at least one salt (S) is present in a proportion of from 1.0 to 10 wt. %, based on total weight of the curing composition.

10. The multi-component epoxy resin system according to claim 1, wherein the salt is a triflate.

11. The multi-component epoxy resin system according to claim 1, wherein the salt is a nitrate.

12. The multi-component epoxy resin system according to claim 1, wherein the at least one salt (S) is other than a triflate of magnesium, calcium, zinc, or tin.

* * * * *